Nov. 21, 1944.   J. R. WRATHALL   2,363,377
DYNAMOMETER
Filed April 26, 1943
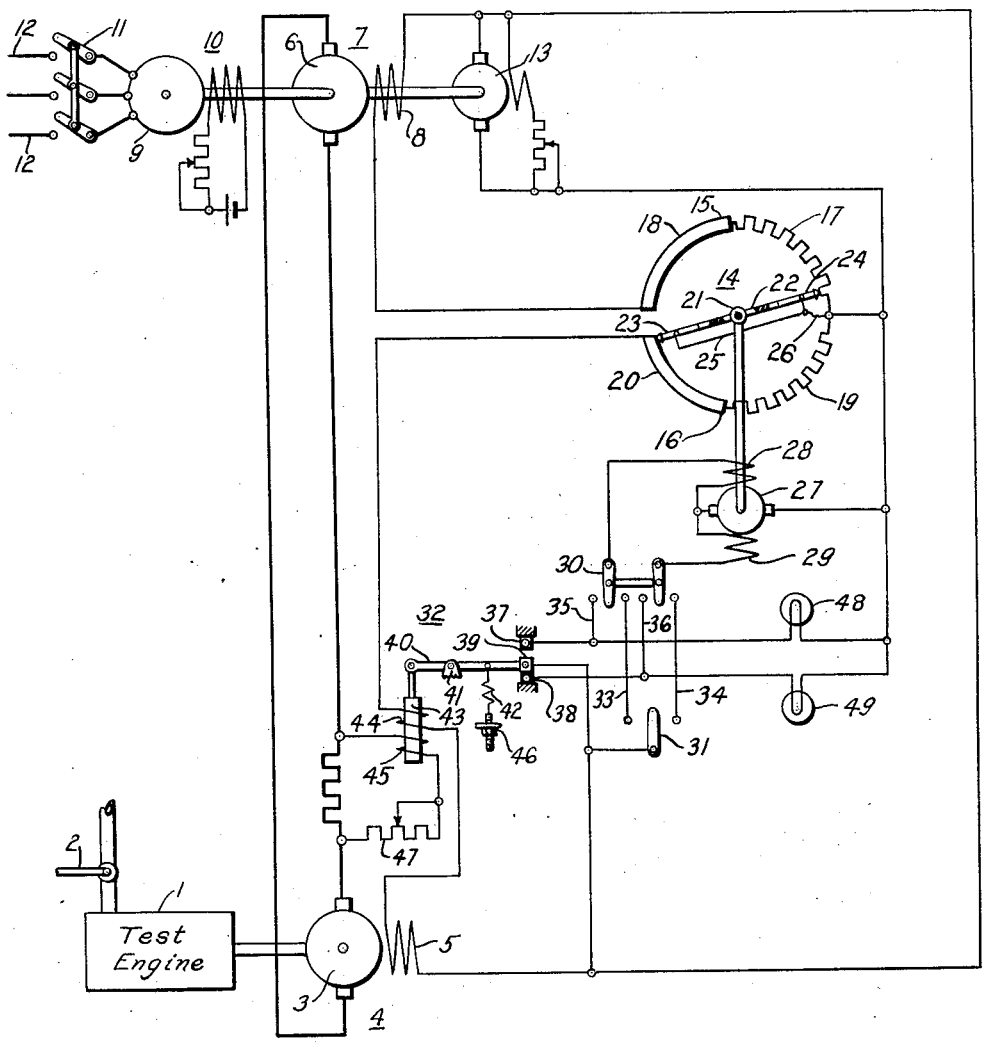
WITNESSES:
INVENTOR
Jay R. Wrathall.
BY
Paul E. Friedemann
ATTORNEY Patented Nov. 21, 1944

2,363,377

UNITED STATES PATENT OFFICE 2,363,377

DYNAMOMETER

Jay R. Wrathall, Pittsburgh, Pa., assignor to Westinghouse Electric & Manufacturing Company, East Pittsburgh, Pa., a corporation of Pennsylvania Application April 26, 1943, Serial No. 484,541

3 Claims. (Cl. 73—134)

This invention relates to dynamometers and, more particularly, to an improved arrangement of control mechanism for controlling the operation of direct current dynamometers for testing the loading conditions of internal combustion engines with varying speeds of operation thereof.

In the testing of internal combustion engines, the use of direct current dynamometers comprising a pair of dynamos electrically connected as a motor-generator set in which the generator is mechanically connected to the engine being tested is well known. However, the control of such dynamometers so as to obtain constant torque conditions of an internal combustion engine presents a difficult problem. This is due to the fact that the output of the direct current generator mechanically connected to the engine being tested will vary considerably with relatively small changes in the speed of operation thereof and will therefore tend to vary the torque on the engine considerably with small changes in the speed of operation.

One of the principal objects of this invention is to provide control means for a direct current dynamometer of the character referred to which is automatically effective to control the absorption capacity of the dynamometer in such manner that a substantially constant torque will be applied to the engine being tested over a wide speed range.

A further object is to provide a control system of the character referred to in which the operation of the direct current dynamometer is automatically responsive to both the current in its armature circuit and the current in the field of the generator connected to the engine being tested.

Other objects and advantages of this invention will become apparent from the following description and accompanying drawing in which the single figure is a diagrammatic representation of a direct current dynamometer testing apparatus having control mechanism therefor constructed in accordance with the principles of this invention.

Referring to the drawing, the numeral 1 designates a test engine of the internal combustion type having a throttle 2 by which the speed of operation thereof may be varied. Although the novel features of this invention are particularly applicable to the testing of engines or prime movers of the internal combustion type, it is to be understood that the principles of this invention are equally applicable to the testing of other types of prime movers.

The test engine 1 is shown mechanically connected to the armature 3 of a direct current dynamo 4 having a control field winding 5. The dynamo 4 is operated as a dynamometer and is provided with the usual cradle mounting (not shown) for its stator carrying the field winding 5, by which the torque being developed may be measured. The specific mounting for the dynamo 4 has not been shown since the mechanical details of such mountings are well known in the art.

The dynamo 4 has its armature electrically connected in series with the armature 6 of a dynamo 7 having a control field winding 8. The armature 6 is provided with a direct mechanical connection to the rotor 9 of a constant speed alternating current machine 10 adapted to be operated as a motor or as a generator. A switch 11 is provided for connecting the machine 10 to alternating current buses 12.

A constant speed generator 13 provides excitation for the control field windings 5 and 8, and a rheostat indicated as a whole by the numeral 14 is provided for varying the strength of the current flowing through such field windings. The rheostat 14 comprises like elements 15 and 16, respectively, connected in the circuit for the winding 8 and in the circuit for the winding 5. The element 15 comprises a resistance 17 and an arcuately shaped contact 18 and the element 16 similarly comprises a resistance 19 and an elongated arcuate contact 20. A rotatable control element 21 is provided for operating the rheostat 14. The control element 21 comprises a central portion 22 formed of insulating material and conducting end portions 23 and 24 forming movable contacts for cooperation with the rheostat elements 15 and 16, respectively, connected in the field circuits as described above. The contact elements 23 and 24 are electrically connected with each other by conducting lead 25 and to the excitation source by a flexible lead 26.

Rotation of the operating member 21 is effected by a reversible motor 27 having split-field series windings 28 and 29. Energization of the winding 28 is effective to rotate the control element 21 in a counterclockwise direction and energization of the winding 29 is effective to rotate the control element 21 in a clockwise direction for purposes to be described.

A double-pole switch 30 is provided for placing the windings 28 and 29 either under the operation of a manual control switch 31 or a relay indicated as a whole by the numeral 32. Upon movement of the switch 30 to the right as viewed in the drawing, the windings 28 and 29 will be respectively connected to leads 33 and 34. Operation of the switch 31 will then be effective to selectively connect either of such windings to the generator 13 for operating the motor 27 to rotate the rheostat control member 21.

Upon movement of the control switch 30 to the left as viewed in the drawing the windings 28 and 29 will be respectively connected to leads 35 and 36. The leads 35 and 36 are respectively connected to stationary contacts 37 and 38 constituting part of the control relay 32. The relay 32 is provided with a movable contact 39 for engagement with the stationary contacts 37 and 38. The contact 39 is carried by an operating member 40 pivoted at 41. The operating member 40 is provided with a spring 42 for biasing it to a position with the movable contact 39 engaged with the stationary contact 38, and a solenoid 43 for operating the member 40 against its bias to a position engaging the contact 39 with the stationary contact 37. A coil 44 in the circuit of the field 5 and a coil 45 connected in parallel with a resistor in the series circuit for the armatures 3 and 6 are provided for operating the solenoid 43. The spring 42 is provided with an adjustable connection 46 by which its tension and the bias on the member 40 may be varied. A variable resistance 47 is provided for varying the current in the coil 45.

When the switch 30 is moved to the left as viewed in the drawing and electrically connected to the leads 35 and 36, the manually operable switch 31 will be ineffective to operate the control member 21 of the rheostat 14. With the switch 30 in such position, engagement of the movable contact 39 with the stationary contact 37 will cause current to flow through the winding 28 to rotate the control member 21 counterclockwise, and engagement of the contact 39 with the stationary contact 38 will cause current to flow through the control winding 29 to rotate the member 21 of the rheostat 14 in a clockwise direction. The torque load on the test engine 1 is dependent upon the operation of the dynamo 4, and it is desirable that such torque be maintained substantially constant for varying speeds of operation of the test engine 1. Since the torque on a direct current machine is proportional to the product of the armature current and field strength, it will be seen that the provision of the two coils 44 and 45 provides an operating force for the solenoid 43 of the relay 32 proportional to the torque on the generator 3 and on the test engine 1. The amount of this torque may be varied by adjusting the resistance 47 or the tension in the spring 42 by adjusting device 46. When the torque is at the proper value, the force of the coils 44 and 45 on the solenoid 43 will pivot lever 40 to balance the movable contact 39 intermediate the contacts 37 and 38. As soon as operating conditions change, the contact 39 will be engaged with one of the contacts 37 or 38 to effect operation of the rheostat 14 so as to adjust the operation of the generator 3 to again balance the movable contact 39.

The operation of the apparatus is as follows: With the test engine dead, the rotor 9 of the alternating current machine 10 is first connected to the alternating current buses 12 by operation of the switch 11 and the machine 10 will be operated as a motor to drive the armatures of generators 7 and 13. At this time the rheostat 14 will be in the position shown in the drawing providing full field for the armature 3 and minimum field for the armature 6. Under these conditions, maximum torque will be provided on the dynamo 4 which will be operating as a motor by current supplied by the dynamo 7 which will be operating as a generator. To start the test engine, the switch 30 is moved to the right to connect the leads 33 and 34 to the fields 28 and 29. The manually operable switch 31 is then moved to the left and connected with the lead 33 for energizing the field 28 of the motor 27 so as to rotate the rheostat control member 21 counterclockwise. Counterclockwise movement of the control member 21 causes the movable contact 24 to shunt out a portion of the resistance 17 to increase the field strength of the winding 8. This increases the voltage output of the dynamo 7 being operated as a generator and the dynamo 4 being operated as a motor will be brought up to speed to start the test engine 1. Upon firing of the test engine 1, the dynamo 4 will be driven and operated as a generator to supply current to the dynamo 7 which will be operated as a motor to drive the alternating current machine 10 which will then feed current back into the alternating current buses 12. The apparatus will then be ready to be placed under the automatic control of the relay 32.

Before moving the switch 30 to the left into engagement with the leads 35 and 36, it is desirable to balance the operation of the dynamo 4 for the speed at which the engine is being operated. In the absence of such balanced condition, the contact 39 will be engaged with one of the stationary contacts 37 or 38. If the contact 39 is engaged with the contact 38, the generator or dynamo 4 will not be providing sufficient torque on the engine 1, and if contact 37 is engaged, the dynamo 4 will be applying too much torque to the test engine 1. Pilot lights 48 and 49 are included in the circuits containing the contacts 37 and 38 for indicating which of such contacts is engaged with the movable contact 39. After starting the engine 1, the switch 31 is actuated to operate the rheostat to a position in which the proper torque is applied to the test engine 1 and when this condition is reached the contact 39 will be balanced between the contacts 37 and 38. At this time, both of the pilot lights 48 or 49 will be out indicating a balanced condition, and the switch 30 may then be moved to the left to connect the leads 35 and 36 in the circuit of the motor 27. The apparatus will then be under the automatic control of the relay 32.

Assuming that the test engine is operating at idling speed at the time automatic control is taken over by the relay 32, the rheostat 14 will be in the position illustrated in the drawing, providing minimum field on the dynamo 7 being operated as a motor and maximum field on the dynamo 4 being operated as a generator. As the speed of the test engine 1 is increased, the voltage output of the dynamo 4 will increase and a rise in the current flowing in its armature circuit will take place. This rise will also be had in the coil 45 and the solenoid 43 will then operate to move the contact 39 into engagement with the contact 37. This will energize the field 28 and the motor 27 will rotate the operating member 21 counterclockwise to shunt out some of the resistance 17 and thus increase the strength of the current flowing in the field winding 8. In this manner, the resistance provided by the dynamo 7 is increased and the current flowing in its armature circuit will drop to thereby reduce the amount of flux in the coil 45 and restore the relay 32 to its balanced condition.

The automatic control provided by the relay 32 will be best understood by considering its operation as the test engine is operated over a speed range comprising a lower speed range and a higher speed range. During increasing speed of the test engine over the lower speed range, the automatic control maintaining the combined effect of the coils 44 and 45 constant is had entirely by adjustment of the strength of the current in the field winding 8 of the dynamo 7. The control is had by gradually increasing the strength of such field winding through operation of the motor 27 to progressively shunt out portions of the resistance 17 as the speed of the test engine is increased over the lower speed range. When the upper limit of the lower speed range is reached, the resistance 17 will have been shunted out of the circuit of the winding 8 and the field provided by such winding will be at its maximum value.

As the test engine moves into its higher speed range, the member 21 of the rheostat 14 will be operated to cause the contact 23 to insert the resistance 19 in the circuit of the field winding 5. As the amount of the resistance 19 in such circuit is increased, the current flowing in the field winding 5 and in the coil 44 will be gradually reduced. An increase in the current flowing in the armature circuit is had during this adjustment to compensate for the decreased current flowing in the coil 44. The control action provided during this higher speed range will thus function to give an increased armature current and a decreasing current in the field winding 5.

If, at any time, the speed of the test engine 1 is decreased, the output of the dynamo 4 will decrease disproportionately to the decrease in speed. The bias provided by the spring 42 on the operating member 40 will then become effective to engage the contact 39 with the stationary contact 38 to energize the winding 29 and operate the motor 27 to move the operating member in a clockwise direction. As the speed of the test engine 1 is decreased, the clockwise movement of the control member 21 will effect a reverse of the above described control action to maintain a constant torque on the test engine 1.

From the foregoing it will be noted that the apparatus of this invention is effective to maintain a substantially constant torque on an engine being tested with varying speeds of operation regardless of whether the speed of operation is increased or decreased. It will be particularly noted that this operation is had by the provision of the torque regulating relay 32 which is operated by the coils 44 and 45. The relay 32 functions in response to changing conditions of the combined strength of the coils 44 and 45 and operates to maintain the combined strength of such coils at a constant value. Since the coils 44 and 45 are respectively in the circuit of the field winding 5 and in the armature circuit of the dynamo 4, it will be seen that their combined strength is always proportional to a function of the field strength and the armature current. By maintaining their combined effect substantially constant at all times, it will be seen that the torque on the test engine 1 will be maintained substantially constant for varying speeds of operation.

Since numerous changes may be made in the above described construction and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. In apparatus for testing driving engines, the combination of a dynamometic braking generator having an armature to be driven by a variable speed engine to be tested and a field winding for coaction with said armature, a motor having an armature connected in series with said generator armature for loading the same and including a field winding, and circuit means connected to said two field windings for varying their respective excitation so as to maintain a constant torque on the engine at varying speeds of operation, said circuit means having control means for varying the excitation of said motor field winding independently of said generator field winding within a lower speed range of the engine and further control means for varying the excitation of said generator field winding independently of said motor field winding within a higher speed range of the engine, and actuating means for controlling both said control means in response to both the current in the series connection of said armatures and the current in said generator field winding.

2. In apparatus for testing driving engines, the combination of a dynamometric braking generator having an armature to be driven by a variable speed engine to be tested and a field winding for coaction with said armature, a motor having an armature connected in series with said generator armature for loading the same and including a field winding, and circuit means connected to said two field windings for varying their respective excitation so as to maintain a constant torque on the engine at varying speeds of operation, said circuit means comprising a first resistance operable to vary the strength of said motor field without changing said generator field, a second resistance operable to vary the strength of said generator field without varying the strength of said motor field, and control means responsive to both the current in said generator field and the current in the series connection of said armatures for automatically adjusting said resistances sequentially corresponding to the speed range of the engine.

3. A dynamometric system for testing driving engines at varying speeds, comprising in combination, a generator armature for connection to the engine to be tested, a motor armature connected in series with said generator armature for loading the same, two field windings associated with said armatures respectively, variable circuit means for controlling the excitation of said field windings so as to maintain a substantially constant torque on the engine, said circuit means having two variable impedance means connected with said two field windings respectively and comprising an adjusting member movable to control said two impedance means sequentially for varying the excitation of one of said windings over a low range of speed of the engine and for varying the excitation of said other winding over a high speed range of the engine, reversible drive means connected with said movable member, control means for actuating said drive means so as to maintain a constant torque on said engine during varying speeds of operation thereof, said control means comprising an actuating member movable in one direction at increasing engine speed and in an opposite direction at decreasing engine speed, said member having a bias for movement in one of said directions and electromagnet means for moving it against its bias in the other direction, and said electromagnet means comprising a coil connected with said armatures and another coil connected with said generator field winding.

JAY R. WRATHALL.